US009347406B2

United States Patent
Abe et al.

(10) Patent No.: US 9,347,406 B2
(45) Date of Patent: May 24, 2016

(54) AIR CLEANER DEVICE FOR VEHICLE

(71) Applicant: HONDA MOTOR CO., LTD., Tokyo (JP)

(72) Inventors: Ryuichi Abe, Wako (JP); Ryosuke Kinoshita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/444,499

(22) Filed: Jul. 28, 2014

(65) Prior Publication Data

US 2015/0034405 A1 Feb. 5, 2015

(30) Foreign Application Priority Data

Jul. 31, 2013 (JP) ................................. 2013-158560
Jan. 31, 2014 (JP) ................................. 2014-016407

(51) Int. Cl.

| B60K 13/02 | (2006.01) |
|---|---|
| F02M 35/02 | (2006.01) |
| F02M 35/04 | (2006.01) |
| B62K 11/04 | (2006.01) |
| F02M 35/16 | (2006.01) |
| F02M 35/10 | (2006.01) |
| B62K 19/48 | (2006.01) |
| B62J 35/00 | (2006.01) |

(52) U.S. Cl.
CPC ............ *F02M 35/0201* (2013.01); *B62K 11/04* (2013.01); *B62K 19/48* (2013.01); *F02M 35/0204* (2013.01); *F02M 35/0205* (2013.01); *F02M 35/048* (2013.01); *F02M 35/10013* (2013.01); *F02M 35/10144* (2013.01); *F02M 35/162* (2013.01); *B62J 35/00* (2013.01)

(58) Field of Classification Search
CPC ................................ B60K 13/02; B60K 13/06
USPC ........................................................ 180/68.3
See application file for complete search history.

(56) References Cited

U.S. PATENT DOCUMENTS

| 4,354,458 | A | * | 10/1982 | Bury | ...................... | B60K 13/02 |
|---|---|---|---|---|---|---|
| | | | | | | 123/184.38 |
| 5,301,767 | A | * | 4/1994 | Shiohara | ................. | B60K 13/06 |
| | | | | | | 180/219 |
| 5,577,570 | A | * | 11/1996 | Shiohara | ................... | B62J 17/00 |
| | | | | | | 180/219 |
| 6,251,151 | B1 | * | 6/2001 | Kobayashi | ............... | F02B 61/02 |
| | | | | | | 123/198 E |
| 6,409,783 | B1 | * | 6/2002 | Miyajima | ............... | F02M 35/04 |
| | | | | | | 123/198 E |

(Continued)

FOREIGN PATENT DOCUMENTS

JP          4128639 B2      7/2008

*Primary Examiner* — Jeffrey J Restifo
(74) *Attorney, Agent, or Firm* — Birch, Stewart, Kolasch & Birch, LLP

(57) ABSTRACT

A compact air cleaner device with a secure intake capacity. An internal combustion engine includes the air cleaner device mounted on a vehicle body frame. The air cleaner device includes an air cleaner case having a filter element therein, and being partitioned into a dirty side chamber and a clean side chamber with a plurality of intake ducts for leading an outside air into the dirty side chamber, the intake ducts being provided so as to form a left-right pair. The intake ducts have intake ports opened outside side portions of the air cleaner case. Paths of the intake ducts leading to discharge ports are housed within the dirty side chamber with bent portions. The discharge ports of the intake ducts forming the left-right pair are disposed so as to be oriented to a central side of the air cleaner case and offset from each other in a forward-rearward direction.

19 Claims, 8 Drawing Sheets

(56) References Cited

U.S. PATENT DOCUMENTS

| | | | | |
|---|---|---|---|---|
| 6,422,201 B1* | 7/2002 | Yamada | F02B 27/06 | 123/184.53 |
| 6,726,737 B2* | 4/2004 | Schorn | B01D 46/002 | 123/198 E |
| 7,357,205 B2* | 4/2008 | Nishizawa | F02M 35/022 | 123/41.56 |
| 7,380,624 B2* | 6/2008 | Momosaki | F02M 35/10013 | 180/68.3 |
| 7,431,114 B2* | 10/2008 | Ohira | B62K 19/46 | 180/219 |
| 9,140,222 B2* | 9/2015 | Shimomura | F02M 35/162 | |
| 2004/0216453 A1* | 11/2004 | Oshima | F01N 13/08 | 60/322 |
| 2005/0045147 A1* | 3/2005 | Ishikawa | F02M 35/10039 | 123/336 |
| 2006/0124379 A1* | 6/2006 | Ohira | B62K 19/46 | 180/292 |
| 2008/0053394 A1* | 3/2008 | Tsutsui | F02M 35/10295 | 123/184.21 |
| 2008/0121449 A1* | 5/2008 | Fujimura | F02M 35/10039 | 180/68.3 |
| 2008/0121450 A1* | 5/2008 | Fujimura | F02M 35/10039 | 180/68.3 |
| 2009/0050386 A1* | 2/2009 | Nobuhira | B62J 17/02 | 180/68.2 |
| 2009/0090090 A1* | 4/2009 | Nishizawa | B01D 46/0005 | 55/290 |
| 2011/0155086 A1* | 6/2011 | Matsuda | F02M 35/10039 | 123/184.61 |
| 2011/0232982 A1* | 9/2011 | Abe | F02M 35/0203 | 180/68.3 |
| 2011/0232983 A1* | 9/2011 | Abe | B01D 46/0005 | 180/68.3 |
| 2013/0192912 A1* | 8/2013 | Shimomura | F02M 35/02416 | 180/68.3 |
| 2013/0220259 A1* | 8/2013 | Ozaki | F02M 35/10091 | 123/184.21 |
| 2014/0060955 A1* | 3/2014 | Kono | F02M 35/162 | 180/291 |
| 2014/0090912 A1* | 4/2014 | Kontani | B62K 11/00 | 180/68.3 |
| 2014/0174394 A1* | 6/2014 | Shimomura | F02M 35/162 | 123/184.21 |
| 2014/0182556 A1* | 7/2014 | Nishimura | F02M 35/162 | 123/470 |
| 2015/0034405 A1* | 2/2015 | Abe | B62J 35/00 | 180/219 |
| 2015/0114744 A1* | 4/2015 | Naruoka | F02M 35/14 | 180/219 |
| 2015/0251720 A1* | 9/2015 | Nishimura | B60K 13/02 | 180/219 |

* cited by examiner

AIR CLEANER DEVICE FOR VEHICLE

CROSS-REFERENCE TO RELATED APPLICATIONS

The present application claims priority under 35 USC 119 to Japanese Patent Application No. 2013-158560 filed Jul. 31, 2013 and Japanese Patent Application No. 2014-016407 filed Jan. 31, 2014 the entire contents of which are hereby incorporated by reference.

BACKGROUND OF THE INVENTION

1. Field of the Invention

The present invention relates to an air cleaner device for a vehicle having an internal combustion engine with the air cleaner device being mounted on a vehicle body frame.

2. Description of Background Art

An air cleaner device applied to a motorcycle having an internal combustion engine and an air cleaner device mounted on a vehicle body frame is known wherein an air cleaner case is disposed in the rear of a head pipe, and an intake air duct portion for taking in an outside air is provided on the upper side half body of the air cleaner case. See, for example, Japanese Patent No. 4128639 (FIGS. 1 to 4).

However, in Japanese Patent No. 4128639, the intake air duct portion is disposed on the upper surface of the air cleaner case. Thus, the air cleaner device may be enlarged in an upward-downward direction, and a cowl covering the air cleaner device may be increased in height.

SUMMARY AND OBJECTS OF THE INVENTION

In view of the above-described conventional technology, it is an object of an embodiment of the present invention to provide an air cleaner device that is formed in a compact manner with a secured intake capacity wherein improved intake performance can be achieved, in a vehicle having an internal combustion engine with the air cleaner device mounted on a vehicle body frame.

In order to solve the above problems, according to an embodiment of the present invention, there is provided an air cleaner device for a vehicle having an internal combustion engine with the air cleaner device mounted on a vehicle body frame. The air cleaner device includes an air cleaner case having a filter element therein, and being partitioned into a dirty side chamber and a clean side chamber. A plurality of intake ducts lead outside air into the dirty side chamber of the air cleaner case with the intake ducts being provided so as to form a left-right pair. The intake ducts forming the left-right pair have intake ports opened to outside side portions of the air cleaner case with paths of the intake ducts leading to the discharge ports. The paths housed within the dirty side chamber have bent portions. The discharge ports of the intake ducts forming the left-right pair are disposed so as to be oriented to a central side of the air cleaner case and are offset from each other in a forward-rearward direction.

According to an embodiment of the present invention, the intake ducts are oriented upwardly from air cleaner case connecting portions attached so as to penetrate the air cleaner case to the discharge ports, and are inclined to vicinities of a ceiling of the dirty side chamber, and the discharge ports are oriented downwardly.

According to an embodiment of the present invention, a fuel tank is mounted on an upper portion of the vehicle body frame of the vehicle. The air cleaner case is disposed between a head pipe of the vehicle body frame and the fuel tank with the intake ports of the intake ducts being opened to a rear of the air cleaner case, and being disposed more to a front than a rear end portion of the air cleaner case.

According to an embodiment of the present invention, a fuel tank is mounted on an upper portion of the vehicle body frame of the vehicle, the air cleaner case is disposed between a head pipe of the vehicle body frame and the fuel tank, and the intake ports of the intake ducts are disposed so as to be opened to a front of the air cleaner case.

According to an embodiment of the present invention, the air cleaner case is divided into an upper side case half body and a lower side case half body, the filter element is disposed between the upper side case half body and the lower side case half body, the dirty side chamber is defined within the upper side case half body, and the clean side chamber is defined within the lower side case half body. The upper side case half body of the air cleaner case is formed so as to be longer in a vehicle width direction than in a forward-rearward direction of the vehicle. The filter element has a plate shape and is disposed such that a longitudinal direction of the filter element is parallel to the vehicle width direction.

According to an embodiment of the present invention, a connecting tube for leading an intake air into the internal combustion engine is connected to the clean side chamber of the air cleaner case. The discharge ports of the intake ducts at least partly overlap a suction port of the connecting tube as viewed in a plan view.

According to an embodiment of the present invention, the intake ducts are formed such that lengths of the intake ducts from air cleaner case connecting portions attached so as to penetrate the air cleaner case to the discharge ports are longer than lengths of the intake ducts from the air cleaner case connecting portions to the intake ports.

According to an embodiment of the present invention, engaging portions are formed on parts of the intake ducts, the parts of the intake ducts being housed in the dirty side chamber, engagement receiving portions are formed on a ceiling of the dirty side chamber, and the engaging portions are engaged with the engagement receiving portions, whereby the intake ducts are fixed.

According to an embodiment of the present invention, an attachment opening for attaching an intake air temperature sensor is formed in an upper rear portion of the upper side case half body of the air cleaner case, and the intake air temperature sensor is disposed in a vicinity of either one of the discharge ports of the intake ducts forming the left-right pair.

According to an embodiment of the present invention, the intake ports of the plurality of intake ducts forming the left-right pair are opened outside the side portions of the air cleaner case, and the paths of the intake ducts leading to the discharge ports for leading out the intake air into the dirty side chamber of the air cleaner case are disposed within the dirty side chamber. Thus, projecting portions for the intake ducts are not formed on the upper portion of the air cleaner case. Therefore a reduction in height can be achieved.

The intake ducts forming the left-right pair have the bent portions in the paths housed within the dirty side chamber, and the discharge ports are disposed so as to be oriented to the central side of the air cleaner case and offset from each other in the forward-rearward direction. Thus, a swirling air flow can be produced within the dirty side chamber at a time of intake, so that the inside of the dirty side chamber can be used uniformly. It is therefore possible to secure an intake capacity and lengths of the intake ducts, and maintain intake performance while making the air cleaner device compact.

According to an embodiment of the present invention, because the discharge ports of the intake ducts are disposed in the vicinity of the ceiling within the dirty side chamber, the inside of the dirty side chamber can be used uniformly. It is therefore possible to secure an intake capacity and lengths of the intake ducts, and maintain intake performance while making a compact air cleaner device.

According to an embodiment of the present invention, it is possible to avoid interference between the fuel tank rearwardly adjacent to the air cleaner case and the intake ports, and surely take in the air, with a space formed between the fuel tank and the intake ports.

According to an embodiment of the present invention, a space in front of the air cleaner case can be used when a sufficient space cannot be secured in the rear of the air cleaner case in the layout of the parts of the vehicle.

According to an embodiment of the present invention, because the air cleaner case is divided into the upper part and the lower part and has the shape longer in the vehicle width direction, the air cleaner device becomes compact in the forward-rearward direction of the vehicle. In addition, because the filter element has the plate shape, a capacity can be secured while the air cleaner device is made compact in a height direction.

According to an embodiment of the present invention, because the positions of the discharge ports of the intake ducts are brought close to the connecting tube in the width direction of the air cleaner case, the size of the air cleaner case in the width direction can be reduced.

According to an embodiment of the present invention, because the intake ducts within the air cleaner case are formed so as to be long, and the intake ducts outside the air cleaner case are formed so as to be short, interference with parts around the air cleaner case is avoided, and tube lengths of the intake ducts can be secured. Thus, intake performance can be maintained while the air cleaner device is made compact.

According to an embodiment of the present invention, because the intake ducts are engaged with and fixed to the ceiling of the dirty side chamber, the intake ducts are positioned easily at a time of assembly. Thus, the vibration of the intake ducts at a time of suction of the intake air is suppressed, so that an air flow can be led in targeted directions.

According to an embodiment of the present invention, the intake air temperature sensor can measure the temperature of the intake air that has just been taken in from the discharge port. In addition, because the attachment opening is provided in the upper rear portion of the air cleaner case, the intake air temperature sensor can be attached in a gap between the air cleaner case and the fuel tank in the rear.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An air cleaner device for a vehicle according to a first embodiment of the present invention will hereinafter be described with reference to FIGS. 1 to 6.

The directions such as a forward direction, a rearward direction, a left direction, a right direction, an upward direction, a downward direction, and the like in the claims and the description of the present specification are in accordance with the direction of the vehicle provided with the air cleaner device for the vehicle according to the present embodiment. The vehicle in the present embodiment is a saddle riding type vehicle having an internal combustion engine and the air cleaner device mounted on a vehicle body frame, and is specifically a motorcycle.

In FIGS. 1-6, an arrow FR indicates the forward direction of the vehicle, an arrow LH indicates the left direction of the vehicle, an arrow RH indicates the right direction of the vehicle, and an arrow UP indicates the upward direction of the vehicle.

Figure 1:
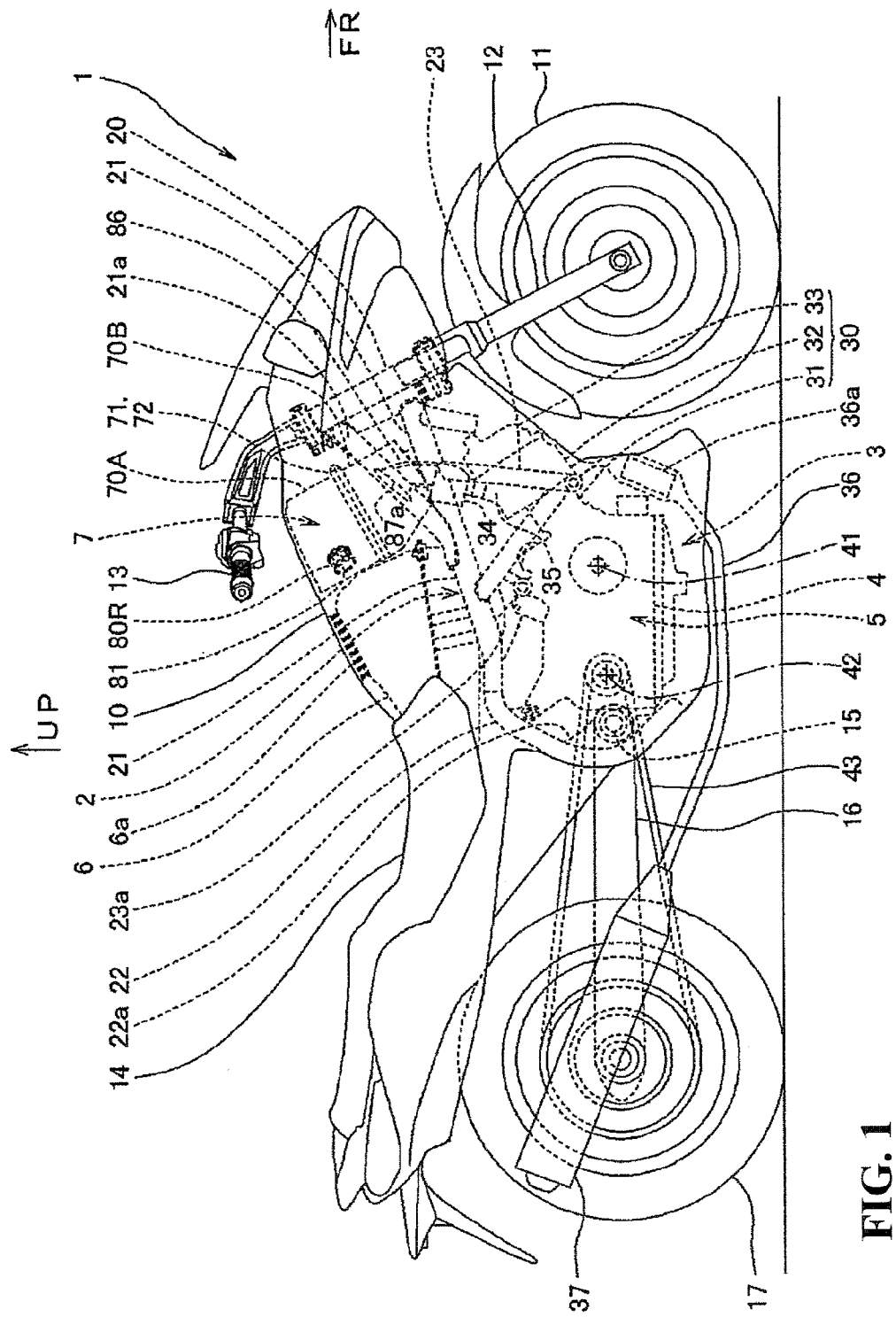
FIG. 1 is a right side view of a motorcycle mounted with an air cleaner device according to a first embodiment of the present invention.

FIG. 1 is a right side view of a motorcycle 1 according to a first embodiment of the present invention. As shown in FIG. 1, the vehicle body frame 2 of the motorcycle 1 according to the present embodiment is covered by a vehicle body cover (cowl) 10 made of a synthetic resin.

The vehicle body frame 2 of the motorcycle 1 includes a head pipe 20 provided in a front end portion of the vehicle, a pair of left and right main frames 21 branching to a left and a right from a lower portion of the head pipe 20 and extending rearward while slanting in a rearwardly downward direction and main reinforcing frames 21a obliquely connecting an upper portion of the head pipe 20 to the left and right main frames 21.

The head pipe 20 steerably supports a front fork 12. The front fork 12 supports a front wheel 11. Steering handlebars 13 are coupled to an upper portion of the front fork 12.

A pair of left and right center frames 22 extends downward from rear ends of the left and right main frames 21 while bending in a rearwardly projected shape.

A left and a right down frame 23 descending rearward at a steep inclination are suspended from portions of the left and right main frames 21 which portions are in the vicinity of the head pipe 20. Lower end portions of the down frames 23 are connected to down reinforcing frames 23a suspended obliquely frontward from longitudinally middle portions of the left and right main frames 21.

Rear frames, not shown in FIGS. 1-6, extend rearward to support a seat 14 for occupants. The rear frames are provided from the center frames 22.

In addition, the left and right main frames 21, the center frames 22, and the rear frames are coupled to each other by cross members, not shown in FIGS. 1-6, to secure rigidity of the vehicle body frame 2.

The seat 14 for occupants is configured as a tandem type seat obtained by integrally forming a seat for a driver and a seat for a passenger. A fuel tank 6 is mounted in front of the seat 14 for occupants and on upper portions of the pair of left and right main frames 21, in such a manner as to be covered by the vehicle body cover 10. In addition, a refueling portion 6a provided on an upper surface of the fuel tank 6 is opened in such a manner so as to penetrate the vehicle body cover 10.

The center frames 22 are provided with a pivot plate 22a. The pivot plate 22a rotatably supports a front end of a rear fork 16 via a pivot bolt 15. A rear wheel 17 is rotatably supported on a rear end of the rear fork 16. The rear fork 16 is vertically swingably supported via a rear shock absorber not shown in the figures.

An internal combustion engine 3 of the motorcycle 1 is suspended on the vehicle body frame 2 at lower end portions of the down frames 23, connecting portions between the main frames 21 and the down reinforcing frames 23a, and upper portions of the center frames 22.

The internal combustion engine 3 forms a so-called power unit integrally including a transmission 5 within a crankcase 4. A crankshaft 41 and a transmission shaft are housed in the crankcase 4. The internal combustion engine 3 is mounted in the motorcycle 1 with the crankshaft 41 oriented in a vehicle width direction (left-right direction).

The power of the internal combustion engine 3 is transmitted from an output shaft 42 projecting to the left from the crankcase 4 to the rear wheel 17 via a chain drive mechanism 43.

The internal combustion engine 3 is an in-line two-cylinder water-cooled four-stroke-cycle engine having a cylinder portion 30 inclined forwardly upward from an upper front portion of the crankcase 4. The cylinder portion 30 includes a cylinder block 31 coupled to the upper front portion of the crankcase 4, a cylinder head 32 coupled to an upper portion of the cylinder block 31 and a cylinder head cover 33 covering an upper portion of the cylinder head 32.

A throttle body 34 and an air cleaner ("air cleaner device" in the present invention) 7 forming an intake system are connected in order to a back surface of the cylinder portion 30 of the internal combustion engine 3.

More specifically, respective intake ports extending from two cylinders of the cylinder block 31 to the back surface of the cylinder head 32 are integrated into one intake port by an intake manifold portion 35 provided with a fuel injection valve not shown in the figures for each cylinder, and the intake port is connected to the single throttle body 34.

The throttle body 34 is attached to the intake manifold portion 35. An upper end (upstream end) of the throttle body 34 is connected with the air cleaner 7 via a connecting tube 86 to be described later.

In addition, an exhaust pipe 36 and a muffler 37 forming an exhaust system are connected in order to a front surface of the cylinder portion 30.

More specifically, the exhaust pipe 36 is connected to outlets of respective exhaust ports extending from the two cylinders to the front surface of the cylinder head 32. The exhaust pipe 36 extends downward, thereafter bends, extends rearward, and is connected to the muffler 37 disposed in a rear portion of the vehicle. In addition, a catalyst 36a is housed in a position of the exhaust pipe 36 that is positioned in front of the engine.

The air cleaner 7 includes an air cleaner case 70 formed by vertical divisions of an upper side case half body 70A and a lower side case half body 70B, a partition member 72 disposed so as to be interposed between the upper side case half body 70A and the lower side case half body 70B, and provided with a filter element 71 and a pair of left and right intake ducts 80L and 80R for introducing an outside air into the air cleaner case 70.

In addition, the lower side case half body 70B is provided with a connecting tube 86 connected to the throttle body 34 on the side of the internal combustion engine 3.

As shown in FIG. 1, the air cleaner case 70 is disposed between the head pipe 20 and the fuel tank 6 mounted on the main frames 21. The air cleaner case 70 is mounted on the vehicle body frame 2 in a state of being interposed between the left and right main frames 21 and the left and right main reinforcing frames 21a.

The connecting tube 86 extends upstream from a lower end thereof connected to the throttle body 34, and is attached to the lower side case half body 70B in such a manner so as to penetrate the lower side case half body 70B. A funnel portion 87a increasing in diameter toward the filter element 71 is formed at a suction port 87 within the lower side case half body 70B.

Figure 2:
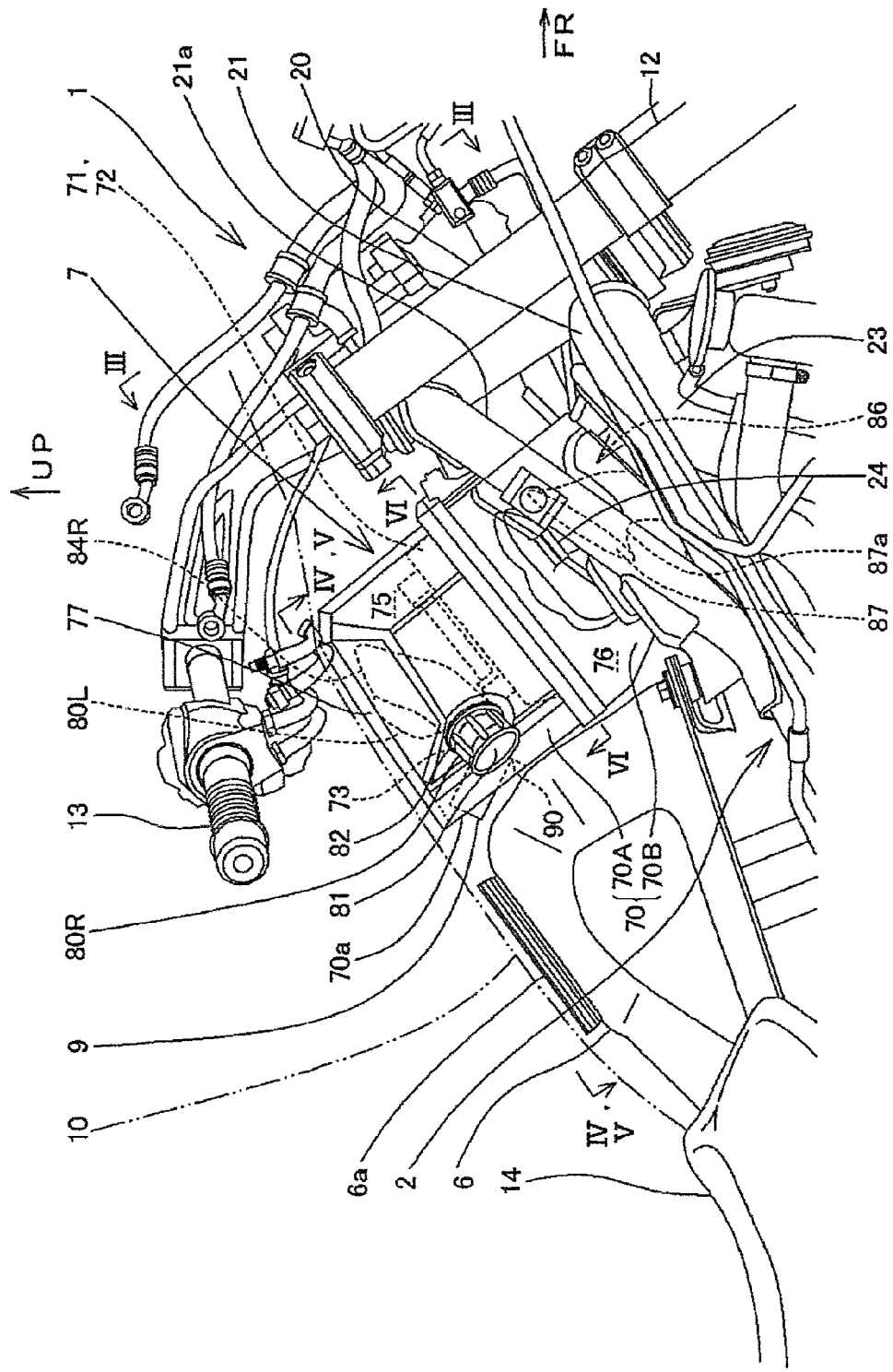
FIG. 2 is a right side view of the air cleaner and vicinities thereof in the motorcycle of FIG. 1 in a state in which a vehicle body cover is removed.

FIG. 2 shows the air cleaner 7 and vicinities thereof in the motorcycle 1 in a state in which the vehicle body cover 10 in FIG. 1 is removed.

Figure 3:
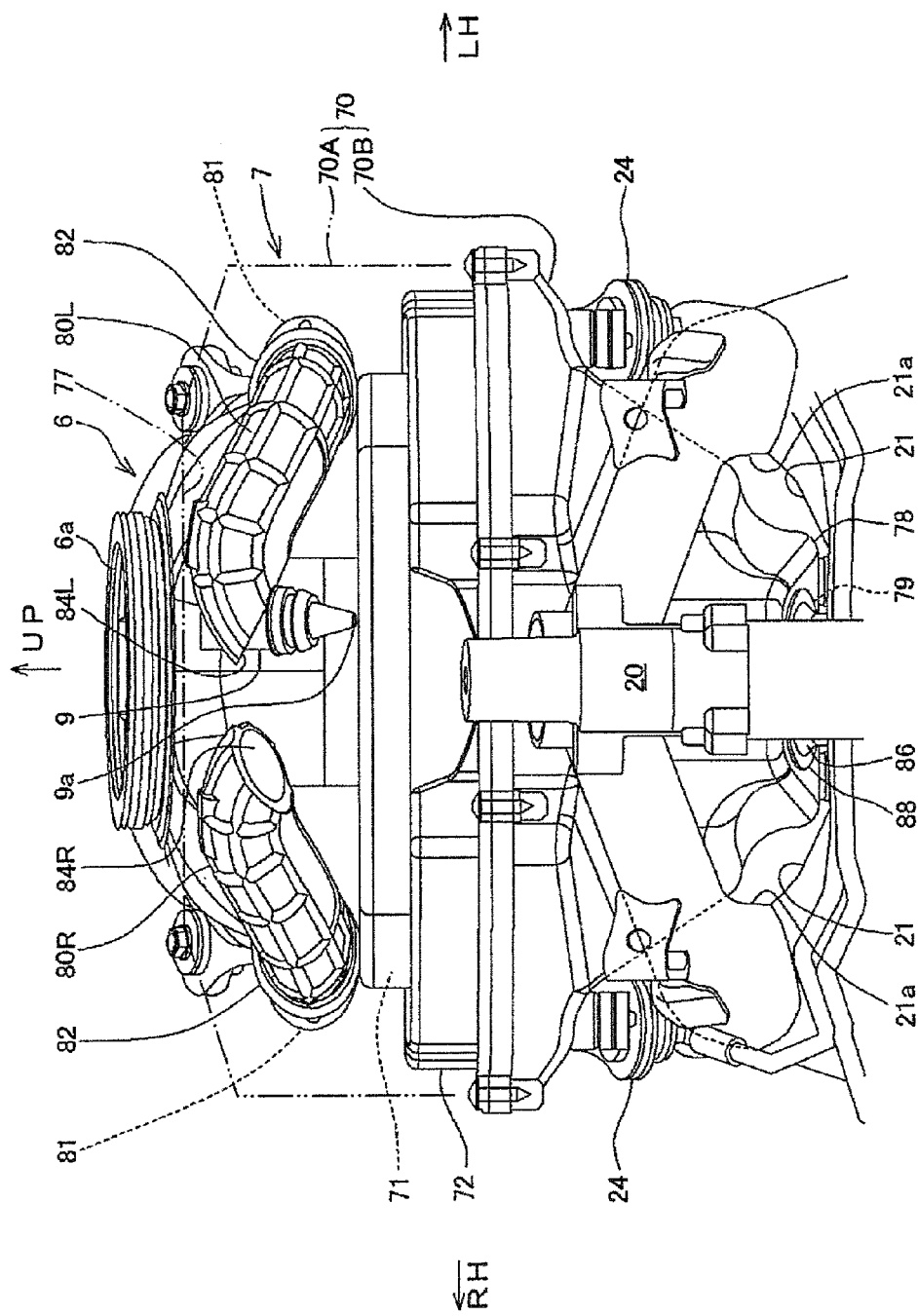
FIG. 3 is a front view taken in the direction of arrows along a line in FIG. 2 with the vehicle body cover and steering handlebars removed, and with the upper side case half body of an air cleaner case further removed.

The lower side case half body 70B of the air cleaner 7 has a lower portion thereof formed with a small width in the vehicle width direction (see FIG. 3). The lower side case half body 70B is disposed between the pair of left and right main reinforcing frames 21a in the vicinity of the head pipe 20, and is attached to attachment brackets 24 of the main reinforcing frames 21a.

Above an upper portion of the lower side case half body 70B which upper portion has a large width in the vehicle width direction as compared with the lower portion of the lower side case half body 70B, the upper side case half body 70A similarly having a large width in the vehicle width direction is fastened with the partition member 72 interposed between the upper side case half body 70A and the lower side case half body 70B. The upper side case half body 70A is disposed so as to be located above the pair of left and right main reinforcing frames 21a and the pair of left and right main frames 21.

FIG. 3 is a front view taken in the direction of arrows along a line in FIG. 2 with the vehicle body cover 10 and the steering handlebars 13 removed, and with the upper side case half body 70A of the air cleaner case 70 further removed.

Thus, the left and right intake ducts 80L and 80R and an intake air temperature sensor 9 to be described later, which are attached to the upper side case half body 70A, are shown in a state of floating in the air.

As shown in FIG. 3, the lower side case half body 70B of the air cleaner case 70 extends downward between the pair of left and right main reinforcing frames 21a, and reaches the position of the pair of left and right main frames 21.

In addition, the upper side case half body 70A is located above the pair of left and right main reinforcing frames 21a, and is formed so as to be wide in the vehicle width direction.

Thus, a sufficient capacity is secured in the air cleaner 7 while a space in a forward-rearward direction for the air cleaner 7 is limited with the air cleaner 7 interposed between the head pipe 20 and the fuel tank 6.

More specifically, while capacities of the upper side case half body 70A and the lower side case half body 70B are secured, the lower side case half body 70B can be disposed in a small space between the frame members 21 and 21a in the vicinity of the head pipe 20 forming the front portion of the vehicle body frame 2, and the frame members 21 and 21a can protect the air cleaner 7.

Figure 4:
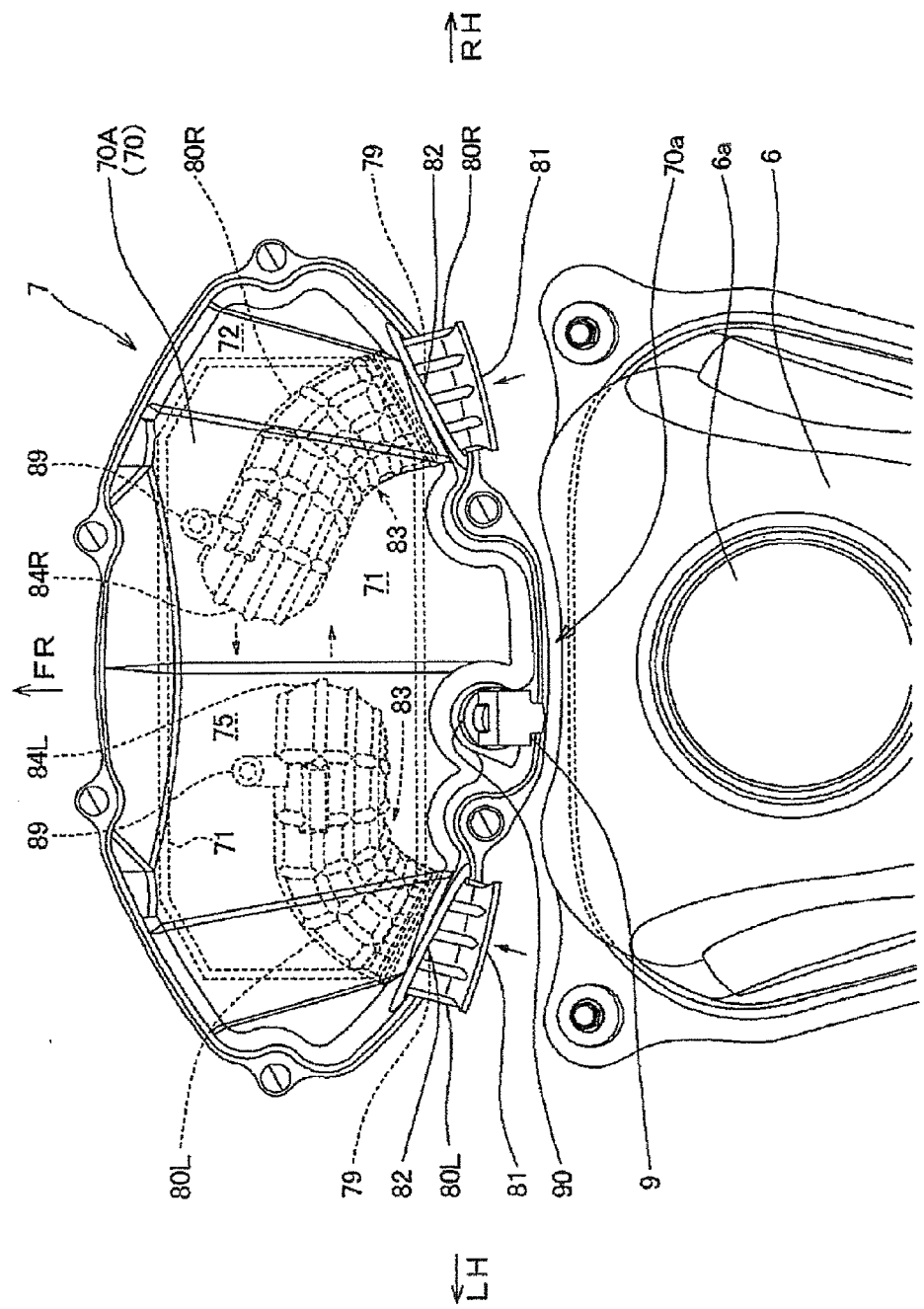
FIG. 4 is a top view of the air cleaner case and a fuel tank, the top view being taken in the direction of arrows along a line IV-IV in FIG. 2, with the vehicle body cover removed.

FIG. 4 is a top view of the air cleaner case 70 and the fuel tank 6, the top view being taken in the direction of arrows along a line IV-IV in FIG. 2, with the vehicle body cover 10 removed. As shown in FIG. 4, the air cleaner case 70 is formed in substantially a rhombic shape longer in the left-right direction of the vehicle (vehicle width direction) than in the forward-rearward direction of the vehicle. The pair of left and right intake ducts 80L and 80R as a plurality of intake ducts is attached to the upper side case half body 70A. Of course, a plurality of intake ducts whose number exceeds two may be provided as the intake ducts 80L and 80R as long as the left and right intake ducts form pairs.

The filter element 71 provided on the partition member 72 interposed and fastened between the upper side case half body 70A and the lower side case half body 70B has a plate shape, and is formed in substantially a rectangular shape that is longer in the left-right direction of the vehicle (vehicle width direction) than in the forward-rearward direction of the vehicle, that is, whose longitudinal direction is parallel to the vehicle width direction, so as to extend over a substantially entire area of the partition member 72.

The left and right intake ducts 80L and 80R are attached to through holes 73 of the upper side case half body 70A at air cleaner case connecting portions 82 of the left and right intake ducts 80L and 80R, the left and right intake ducts 80L and 80R both having an intake port 81 facing rearwardly. The left and right intake ducts 80L and 80R extend frontward within the upper side case half body 70A, and bent portions 83 whose paths are in substantially the shape of an L make a left and a right discharge port 84L and 84R oriented to a central side of the vehicle in opposite directions from each other.

In addition, the left and right discharge ports 84L and 84R leading out the outside air are disposed so as to be offset from each other in the forward-rearward direction. In the present embodiment, the left discharge port 84L is located in the rear of the right discharge port 84R.

The left and right intake ducts 80L and 80R introduce the outside air into the upper side case half body 70A. The partition member 72 and the filter element 71 define a dirty side chamber 75 partitioned from the inside of the lower side case half body 70B. A clean side chamber 76 is defined within the lower side case half body 70B.

The dirty side chamber 75 communicates with the clean side chamber 76 within the lower side case half body 70B via the filter element 71.

Because the discharge ports 84L and 84R of the left and right intake ducts 80L and 80R are disposed so as to be offset from each other in the forward-rearward direction within the dirty side chamber 75, a swirling air flow occurs (counterclockwise as viewed from above in the present embodiment) within the dirty side chamber 75 at a time of intake. Thus, an imbalance in usage range within the dirty side chamber 75 wide in the vehicle width direction can be prevented from occurring, and the filter element 71 wide in the vehicle width direction can be made to function uniformly. Because the inside of the dirty side chamber 75 can be used uniformly, intake performance can be maintained while the air cleaner 7 is made compact.

In addition, the intake ports 81 and 81 of the left and right intake ducts 80L and 80R are opened on the outside of a rear side portion of the air cleaner case 70, and the paths of the intake ducts 80L and 80R leading to the discharge ports 84L and 84R that lead out the intake air are disposed within the dirty side chamber 75 of the air cleaner case 70. Therefore projecting portions for the intake ducts 80L and 80R are not formed on the upper portion of the air cleaner case 70. Thus, the height of the air cleaner 7 is reduced, so that the air cleaner 7 can be formed in a compact manner. Thus, the height of a device covering the upper portion of the air cleaner case 70 or the vehicle body cover 10, in particular, can be reduced.

In addition, the respective intake ports 81 of the left and right intake ducts 80L and 80R are located more to the front than a rear end portion 70a of the air cleaner case 70 formed in a substantially rhombic shape as viewed in a plan view, so that a gap between the intake ports 81 and the rearwardly adjacent fuel tank 6 is secured.

In addition, the shape of the fuel tank 6 can be set relatively freely. Coupled with this, it is easy to form spaces around the intake ports 81 between the intake ports 81 and the fuel tank 6, so that intake is ensured even in the spaces limited in the forward-rearward direction.

In addition, for effective use of the space within the dirty side chamber 75 by a sufficient swirling air flow, the intake outside air introduced into the upper side case half body 70A needs to have a required flow velocity. In order to obtain the flow velocity of the incoming outside air, the lengths of the left and right intake ducts 80L and 80R need to be secured.

In order to avoid interference with the fuel tank 6, the intake ports 81 cannot be positioned so as to extend long rearward from the air cleaner case connecting portions 82. Thus, in the present embodiment, necessary lengths of the left and right intake ducts 80L and 80R are secured by setting lengths from the air cleaner case connecting portions 82 to the left and right discharge ports 84L and 84R in the frontward direction within the upper side case half body 70A longer than lengths from the air cleaner case connecting portions 82 to the intake ports 81.

In addition, as shown in FIG. 3 (see also FIG. 2), the left and right intake ducts 80L and 80R are inclined upward from the air cleaner case connecting portions 82 to the respective left and right discharge ports 84L and 84R, and further the discharge ports 84L and 84R are oriented downwardly. The discharge ports 84L and 84R are disposed in the vicinity of a ceiling 77 within the dirty side chamber 75. Thus, a vertical imbalance in usage range within the dirty side chamber 75 can be prevented from occurring. Because the inside of the dirty side chamber 75 can be used uniformly, intake performance can be maintained while the air cleaner 7 is made compact.

Figure 5:
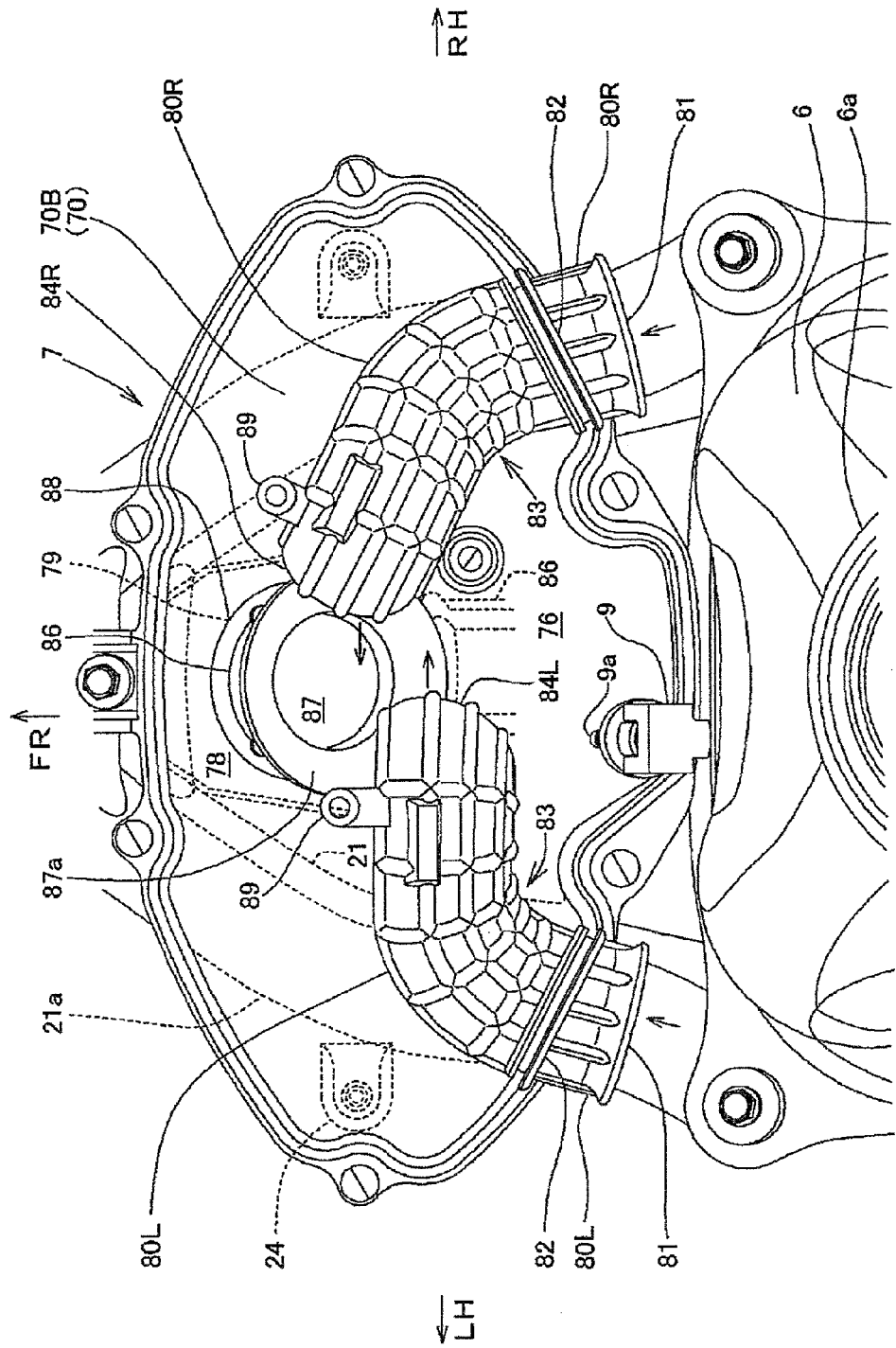
FIG. 5 is a top view of the lower side case half body of the air cleaner case and the fuel tank, the top view being taken in the direction of arrows along a line V-V in FIG. 2, with the vehicle body cover removed, and with the upper side case half body of the air cleaner case, a partition member, and a filter element removed.

FIG. 5 is a top view of the lower side case half body 70B of the air cleaner case 70 and the fuel tank 6, the top view being taken in the direction of arrows along a line V-V in FIG. 2, with the vehicle body cover 10 removed, and with the upper side case half body 70A of the air cleaner case 70, the partition member 72, and the filter element 71 removed. The left and right intake ducts 80L and 80R and an intake air temperature sensor 9 attached to the upper side case half body 70A are shown in a state of floating in the air.

As shown in FIG. 5, a clean side chamber connecting portion 88 on the upstream side of the connecting tube 86 is attached to a through hole 79 of the lower side case half body 70B in a bottom portion 78 of the lower side case half body 70B. The funnel portion 87a forming the suction port 87 is opened toward the filter element 71 within the lower side case half body 70B (see FIG. 1 and FIG. 2).

In addition, as shown in FIG. 5, the discharge ports 84L and 84R of the left and right intake ducts 80L and 80R partly overlap the suction port 87 of the connecting tube 86 as viewed in a plan view. Such an arrangement of the left and right intake ducts 80L and 80R reduces the width of the air cleaner case 70 in which the left and right intake ducts 80L and 80R are placed.

In addition, in the present embodiment, the intake air temperature sensor 9 is attached to an attachment opening 90 provided in an upper rear portion of the upper side case half body 70A of the air cleaner case 70. A detecting end 9a of the intake air temperature sensor 9 is inserted into the upper side case half body 70A, and extends obliquely forwardly downward to be disposed in the vicinity of the discharge port 84L of the left intake duct 80L (see FIG. 3).

Therefore, the intake air temperature sensor 9 can detect the temperature of the intake air that has just been taken in from the discharge port 84L of the left intake duct 80L with little disturbance. Because the intake air temperature sensor 9 is attached in an empty space between the upper rear portion of the upper side case half body 70A and the upper portion of the fuel tank 6, the position of attachment of the intake air temperature sensor 9 can be obtained in the small space, and the maintenance of the intake air temperature sensor 9 is facilitated.

In addition, as shown in FIG. 5, engaging portions 89 for fixing the left and right intake ducts 80L and 80R, respectively, are formed within the dirty side chamber 75.

Figure 6:
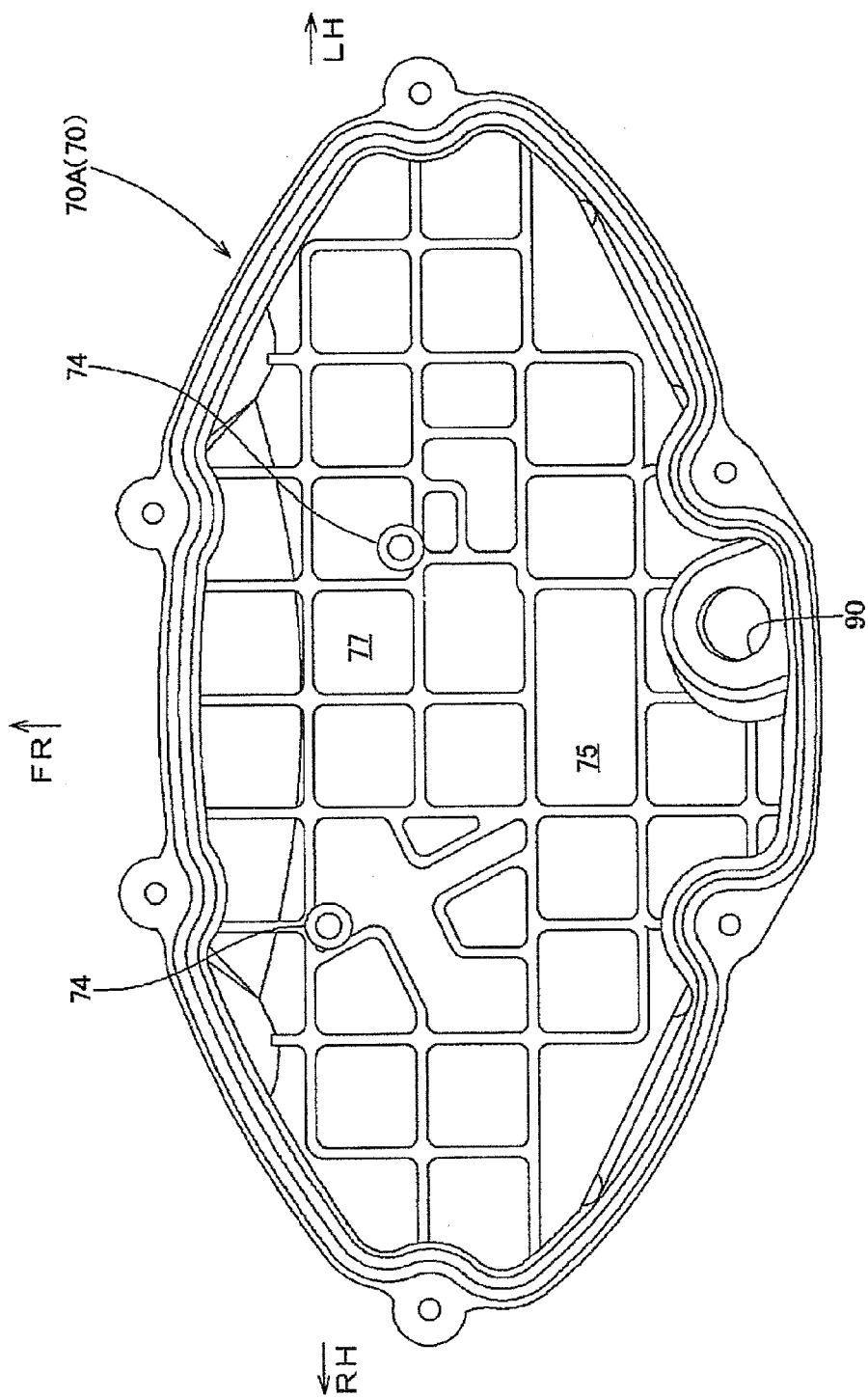
FIG. 6 is a bottom view of the inner surface of the upper side case half body, the bottom view being taken in the direction of arrows along a line VI-VI in FIG. 2.

On the other hand, as shown in FIG. 6, which shows the inner surface of the upper side case half body 70A, FIG. 6 being taken in the direction of arrows along a line VI-VI in FIG. 2, engagement receiving portions 74 are formed on the inner surface of the upper side case half body 70A, that is, the ceiling 77 of the dirty side chamber 75.

More specifically, the respective engaging portions 89 of the left and right intake ducts 80L and 80R are engaged with the engagement receiving portions 74 on the ceiling 77 of the dirty side chamber 75, whereby the left and right intake ducts 80L and 80R are fixed to the inside of the upper side case half body 70A.

Thus, the air cleaner case connecting portions 82 and the engaging portions 89 allow the left and right intake ducts 80L and 80R to be positioned easily at a time of assembly, and the vibration of the intake ducts 80L and 80R at a time of intake is suppressed, so that the leading of an air flow in targeted directions is facilitated.

Features of the air cleaner device for a vehicle according to the present embodiment described above will be described again in the following summary.

In a motorcycle 1 having an internal combustion engine 3 and an air cleaner 7 mounted on a vehicle body frame 2, the air cleaner 7 has an air cleaner case 70, the air cleaner case 70 has a filter element 71 within the air cleaner case 70, and is partitioned into a dirty side chamber 75 and a clean side chamber 76, and a plurality of intake ducts 80L and 80R for leading an outside air into the dirty side chamber 75 of the air cleaner case 70 are provided so as to form a left-right pair. The intake ducts 80L and 80R forming the left-right pair have intake ports 81 opened outside rear side portions of the air cleaner case 70, and of paths of the intake ducts 80L and 80R leading to discharge ports 84L and 84R for leading out the intake air into the dirty side chamber 75, paths housed within the dirty side chamber 75 have bent portions 83. The discharge ports 84L and 84R of the intake ducts 80L and 80R forming the left-right pair are disposed so as to be oriented to a central side of the air cleaner case 70 and offset from each other in a forward-rearward direction.

Thus, the intake ports 81 of the plurality of intake ducts 80L and 80R forming the left-right pair are opened outside the rear side portions of the air cleaner case 70, and the paths of the intake ducts 80L and 80R leading to the discharge ports 84L and 84R for leading out the intake air into the dirty side chamber 75 of the air cleaner case 70 are disposed within the dirty side chamber 75. Thus, projecting portions for the intake ducts 80L and 80R are not formed on the upper portion of the air cleaner case 70. Therefore a reduction in height can be achieved.

The intake ducts 80L and 80R forming the left-right pair have the bent portions 83 in the paths housed within the dirty side chamber 75, and the discharge ports 84L and 84R are disposed so as to be oriented to the central side of the air cleaner case 70 and offset from each other in the forward-rearward direction. Thus, a swirling air flow can be produced within the dirty side chamber 75 at a time of intake, so that the inside of the dirty side chamber 75 can be used uniformly. It is therefore possible to secure an intake capacity and lengths of the intake ducts 80L and 80R, and maintain intake performance while making the air cleaner 7 compact.

In addition, the intake ducts 80L and 80R are oriented upward from air cleaner case connecting portions 82 attached so as to penetrate the air cleaner case 70 to the discharge ports 84L and 84R, and are inclined to vicinities of a ceiling 77 of the dirty side chamber 75. The discharge ports 84L and 84R are oriented downward.

Thus, because the discharge ports 84L and 84R of the intake ducts 80L and 80R are disposed in the vicinity of the ceiling 77 within the dirty side chamber 75, the inside of the dirty side chamber 75 can be used uniformly. It is therefore possible to secure an intake capacity and lengths of the intake ducts 80L and 80R, and maintain intake performance while making the air cleaner 7 compact.

In addition, the motorcycle 1 has a fuel tank 6 mounted on an upper portion of the vehicle body frame 2. The air cleaner case 70 is disposed between a head pipe 20 of the vehicle body frame 2 and the fuel tank 6. The intake ports 81 of the intake ducts 80L and 80R are opened to a rear of the air cleaner case 70, and are disposed more to a front than a rear end portion 70a of the air cleaner case 70. It is thus possible to avoid interference between the fuel tank 6 rearwardly adjacent to the air cleaner case 70 and the intake ports 81, and surely take in the air, with a space formed between the fuel tank 8 and the intake ports 81.

In addition, the air cleaner case 70 is divided into an upper side case half body 70A and a lower side case half body 70B. The filter element 71 is disposed between the upper side case half body 70A and the lower side case half body 70B. The dirty side chamber 75 is defined within the upper side case half body 70A. The clean side chamber 76 is defined within the lower side case half body 70B. The upper side case half body 70A of the air cleaner case 70 is formed so as to be longer in a vehicle width direction than in a forward-rearward direction of the vehicle. The filter element 71 has a plate shape, and is disposed such that a longitudinal direction of the filter element 71 is parallel to the vehicle width direction.

Therefore, because the air cleaner case 70 is divided into the upper part and the lower part and has the shape longer in the vehicle width direction, the air cleaner 7 becomes compact in the forward-rearward direction of the vehicle. In addition, because the filter element 71 has the plate shape, a capacity can be secured while the air cleaner 7 is made compact in a height direction.

In addition, a connecting tube 86 for leading an intake air into the internal combustion engine 3 is connected to the clean side chamber 76 of the air cleaner case 70, and the discharge ports 84L and 84R of the intake ducts 80L and 80R at least partly overlap a suction port 87 of the connecting tube 86 as viewed in a plan view.

Therefore, because the positions of the discharge ports 84L and 84R of the intake ducts 80L and 80R are brought close to the connecting tube in the width direction of the air cleaner case 70, the size of the air cleaner case 70 in the width direction can be reduced.

In addition, the intake ducts 80L and 80R are formed such that the lengths of the intake ducts 80L and 80R from air cleaner case connecting portions 82 to the discharge ports 84L and 84R are longer than the lengths of the intake ducts 80L and 80R from the air cleaner case connecting portions 82 to the intake ports 81.

Therefore, because the intake ducts 80L and 80R within the air cleaner case 70 are formed so as to be long, and the intake ducts 80L and 80R outside the air cleaner case 70 are formed so as to be short, thus, interference with parts around the air cleaner case 70 is avoided, and tube lengths of the intake ducts 80L and 80R can be secured. Further, the intake performance can be maintained while the air cleaner device is made compact.

In addition, engaging portions 89 are formed on parts of the intake ducts 80L and 80R, the parts of the intake ducts 80L and 80R being housed in the dirty side chamber 75. Engagement receiving portions 74 are formed on a ceiling 77 of the dirty side chamber 75. The engaging portions 89 are engaged with the engagement receiving portions 74, whereby the intake ducts 80L and 80R are fixed.

Therefore, because the intake ducts 80L and 80R are engaged with and fixed to the ceiling 77 of the dirty side chamber 75, the intake ducts 80L and 80R are positioned easily at a time of assembly, and the vibration of the intake ducts 80L and 80R at a time of suction of the intake air is suppressed, so that an air flow can be led in targeted directions.

An attachment opening 90 for attaching an intake air temperature sensor 9 is formed in an upper rear portion of the upper side case half body 70A of the air cleaner case 70, and the intake air temperature sensor 9 is disposed in a vicinity of the discharge port 84L of the intake duct 80L. Thus, the intake air temperature sensor 9 can measure the temperature of the intake air that has just been taken in from the discharge port 84L. In addition, because the attachment opening 90 is provided in the upper rear portion of the air cleaner case 70, the intake air temperature sensor 9 can be attached in a gap between the air cleaner case 70 and the fuel tank 6 in the rear.

In addition, the discharge port 84R of the right intake duct 80R may be disposed in the vicinity of the intake air temperature sensor 9.

An air cleaner device for a vehicle according to a second embodiment of the present invention will be described in the following with reference to FIG. 7 and FIG. 8.

Directions such as a forward direction, a rearward direction, a left direction, a right direction, an upward direction, a downward direction, and the like in the claims and the description of the present specification and the directions of arrows in the figures are the same as in the first embodiment.

In the second embodiment, the orientations and positions of attachment of intake ducts 80L and 80R in an air cleaner case 70 are different from those in the first embodiment. Otherwise, the other device configuration of the second embodiment is similar to that of the second embodiment. The functions, action, and effect of the second embodiment are also similar to those of the first embodiment. Thus, corresponding members, devices, and the like are identified by the same reference numerals as in the first embodiment in the figures, the specification, and claims. Differences in the attachment orientations and positions from the first embodiment and resulting differences in action and effect will be mainly described with reference to FIG. 7 and FIG. 8. A description of other common constitutions and other action and effect will be omitted.

Figure 7:
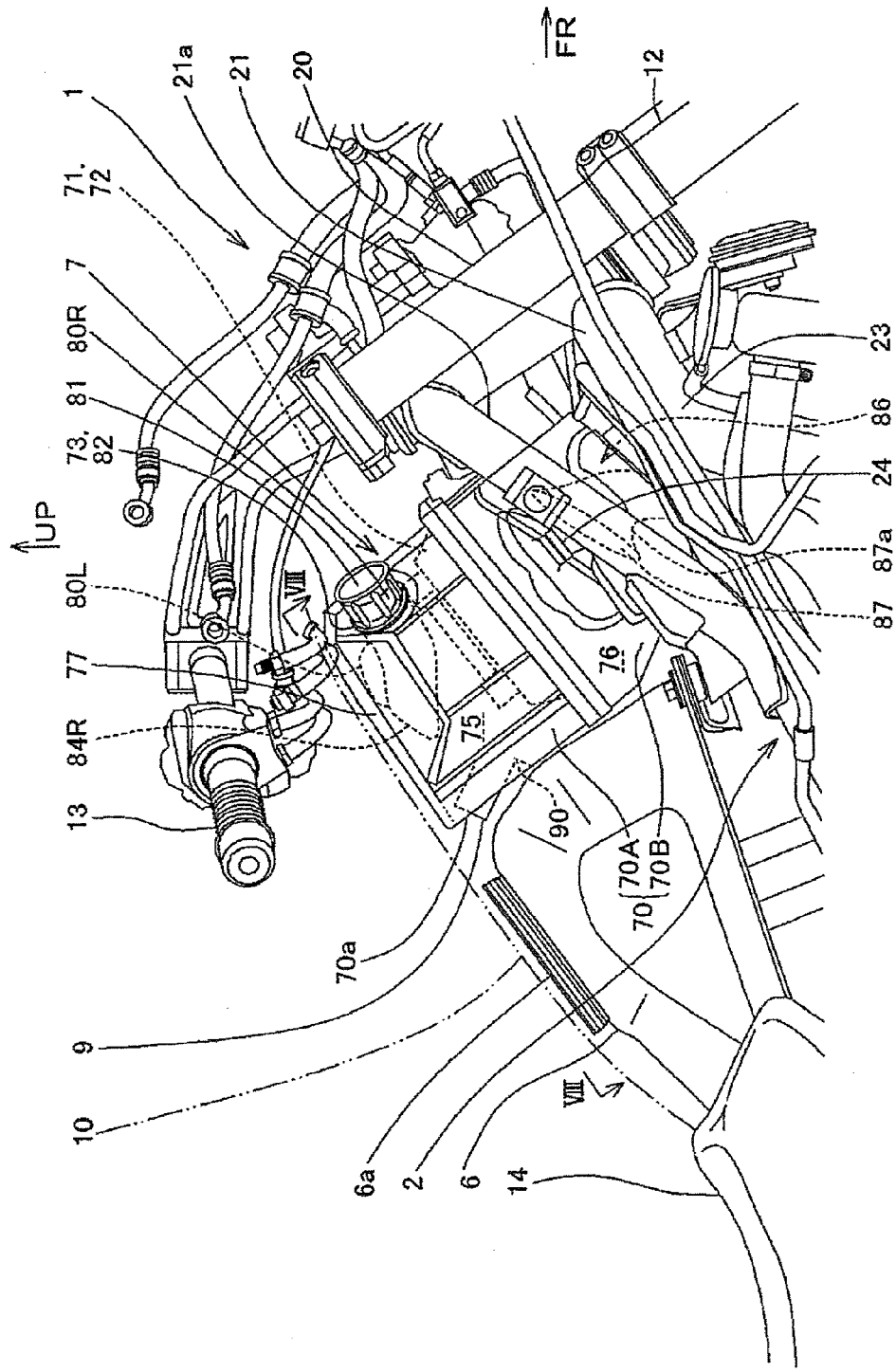
FIG. 7 is a right side view of an air cleaner device according to a second embodiment of the present invention and vicinities thereof in a motorcycle mounted with the air cleaner device in a state in which a vehicle body cover is removed, as in FIG. 2.

As shown in FIG. 7, in the second embodiment, as in the first embodiment, a fuel tank 6 is mounted on an upper portion of a vehicle body frame 2 of a motorcycle 1 as shown in FIG. 1, and an air cleaner case 70 is disposed between a head pipe 20 of the vehicle body frame 2 and the fuel tank 6. However, intake ports 81 of a left and a right intake duct 80L and 80R are disposed so as to be opened to the front of the air cleaner case 70.

Figure 8:
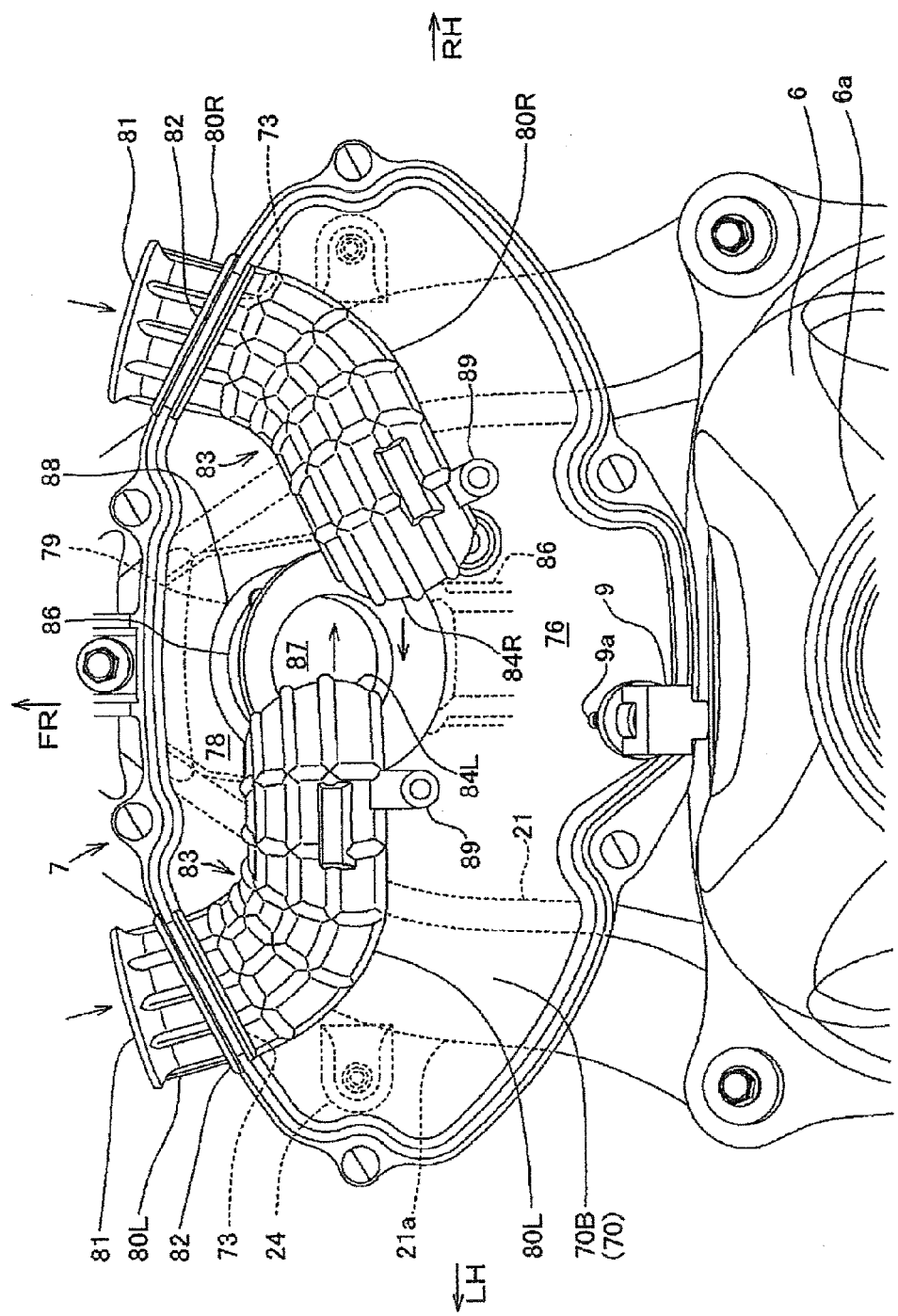
FIG. 8 is a top view of the lower side case half body of an air cleaner case and a fuel tank in the second embodiment, the top view being taken in the direction of arrows along a line VIII-VIII in FIG. 7, with the vehicle body cover removed, and with the upper side case half body of the air cleaner case, a partition member, and a filter element removed, as in FIG. 5.

FIG. 8 is a top view of a lower side case half body 70B of the air cleaner case 70 and the fuel tank 6, the top view being taken in the direction of arrows along a line VIII-VIII in FIG. 7, with a vehicle body cover 10 removed, and with an upper side case half body 70A of the air cleaner case 70, a partition member 72, and a filter element 71 removed.

As shown in FIG. 8, the arrangement of the intake ducts 80L and 80R within the air cleaner case 70 is similar to that in the first embodiment except that the front and the rear are reversed.

However, the intake ports 81 of the left and right intake ducts 80L and 80R are disposed so as to be opened to the front of the air cleaner case 70, unlike the first embodiment.

Therefore, the intake ports 81 can be disposed by using a space in front of the air cleaner case 70 when a sufficient space cannot be secured in the rear of the air cleaner case 70 in the layout of the parts of the motorcycle 1.

In addition, the positions of the engaging portions 89 of the intake ducts 81L and 80R of the second embodiment in FIG. 8 are different from those of the engaging portions 89 of the first embodiment in FIG. 5. Thus, though not shown in the figures, engagement receiving portions (74) in the second embodiment are similarly provided at positions different from those of the engagement receiving portions 74 of the first embodiment shown in FIG. 6, so as to correspond to the positions of the engaging portions 89 of the second embodiment.

In addition, while the discharge port 84R of the right intake duct 80R is disposed in the vicinity of the intake air temperature sensor 9 in FIG. 8, the discharge port 84L of the left intake duct 80L may be disposed in the vicinity of the intake air temperature sensor 9 in FIG. 8.

The above-described embodiment only represents exemplary modes of the present invention, and is susceptible of arbitrary modifications and applications without departing from the spirit of the present invention. For example, in the foregoing embodiment, a description has been made of a case where the present invention is applied to a motorcycle as shown in FIG. 1. However, without being limited to this, the present invention may be applied to other vehicles, for example other saddle riding type vehicles and the like. In addition, the saddle riding type vehicles include vehicles in general that are ridden while the vehicle bodies of the vehicles are straddled, and include not only motorcycles but also three-wheeled vehicles and four-wheeled vehicles such as buggies and the like.

In addition, the arrangement of the left and the right of the air cleaner device according to the embodiment is an example. The present invention is also applied to an arrangement in which the left and the right are reversed.

Further, the arrangement of the air cleaner device of the present invention can be either the arrangement in which the intake ports of the intake ducts open rearwardly similar to the first embodiment, or the arrangement in which the intake ports of the intake ducts open forwardly similar to the second embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air cleaner device for a vehicle, the vehicle having an internal combustion engine with the air cleaner device being mounted on a vehicle body frame, the air cleaner device comprising:
    an air cleaner case having a filter element therein, and being partitioned into a dirty side chamber and a clean side chamber;
    a plurality of intake ducts for leading an outside air into the dirty side chamber of the air cleaner case, the intake ducts being provided so as to form a left-right pair;
    wherein the intake ducts forming the left-right pair have intake ports opened outside side portions of the air cleaner case, and paths of the intake ducts leading to discharge ports, said paths housed within the dirty side chamber include bent portions;
    the discharge ports of the intake ducts forming the left-right pair are disposed so as to be oriented to a central side of the air cleaner case and offset from each other in a forward-rearward direction; and
    a connecting tube for leading an intake air into the internal combustion engine is connected to the clean side chamber of the air cleaner case, and the discharge ports of the intake ducts at least partly overlap a suction port of the connecting tube as viewed in a plan view.

2. The air cleaner device for a vehicle according to claim 1, wherein the intake ducts are oriented upwardly from air cleaner case connecting portions attached so as to penetrate the air cleaner case to the discharge ports, and are inclined to vicinities of a ceiling of the dirty side chamber, and the discharge ports are oriented downwardly.

3. The air cleaner device for a vehicle according to claim 2, wherein a fuel tank is mounted on an upper portion of the vehicle body frame of the vehicle; and
    the air cleaner case is disposed between a head pipe of the vehicle body frame and the fuel tank, and the intake ports of the intake ducts are opened to a rear of the air cleaner case, and are disposed more to a front than a rear end portion of the air cleaner case.

4. The air cleaner device for a vehicle according to claim 2, wherein a fuel tank is mounted on an upper portion of the vehicle body frame of the vehicle; and
    the air cleaner case is disposed between a head pipe of the vehicle body frame and the fuel tank, and the intake ports of the intake ducts are disposed so as to be opened to a front of the air cleaner case.

5. The air cleaner device for a vehicle according to claim 2, wherein the air cleaner case is divided into an upper side case half body and a lower side case half body, the filter element is disposed between the upper side case half body and the lower side case half body, the dirty side chamber is defined within the upper side case half body, and the clean side chamber is defined within the lower side case half body;
    the upper side case half body of the air cleaner case is formed so as to be longer in a vehicle width direction than in a forward-rearward direction of the vehicle; and
    the filter element has a plate shape, and is disposed such that a longitudinal direction of the filter element is parallel to the vehicle width direction.

6. The air cleaner device for a vehicle according to claim 2, wherein a connecting tube for leading an intake air into the internal combustion engine is connected to the clean side chamber of the air cleaner case, and the discharge ports of the intake ducts at least partly overlap a suction port of the connecting tube as viewed in a plan view.

7. The air cleaner device for a vehicle according to claim 2, wherein the intake ducts are formed such that lengths of the intake ducts from air cleaner case connecting portions attached so as to penetrate the air cleaner case to the discharge ports are longer than lengths of the intake ducts from the air cleaner case connecting portions to the intake ports.

8. The air cleaner device for a vehicle according to claim 2, wherein engaging portions are formed on parts of the intake ducts, the parts of the intake ducts being housed in the dirty side chamber, engagement receiving portions are formed on a ceiling of the dirty side chamber, and the engaging portions are engaged with the engagement receiving portions, whereby the intake ducts are fixed.

9. The air cleaner device for a vehicle according to claim 1, wherein a fuel tank is mounted on an upper portion of the vehicle body frame of the vehicle; and
    the air cleaner case is disposed between a head pipe of the vehicle body frame and the fuel tank, and the intake ports of the intake ducts are opened to a rear of the air cleaner case, and are disposed more to a front than a rear end portion of the air cleaner case.

10. The air cleaner device for a vehicle according to claim 1, wherein a fuel tank is mounted on an upper portion of the vehicle body frame of the vehicle; and
    the air cleaner case is disposed between a head pipe of the vehicle body frame and the fuel tank, and the intake ports of the intake ducts are disposed so as to be opened to a front of the air cleaner case.

11. The air cleaner device for a vehicle according to claim 1, wherein the air cleaner case is divided into an upper side case half body and a lower side case half body, the filter element is disposed between the upper side case half body and the lower side case half body, the dirty side chamber is defined within the upper side case half body, and the clean side chamber is defined within the lower side case half body;
    the upper side case half body of the air cleaner case is formed so as to be longer in a vehicle width direction than in a forward-rearward direction of the vehicle; and
    the filter element has a plate shape, and is disposed such that a longitudinal direction of the filter element is parallel to the vehicle width direction.

12. The air cleaner device for a vehicle according to claim 11, wherein an attachment opening for attaching an intake air temperature sensor is formed in an upper rear portion of the upper side case half body of the air cleaner case, and the intake air temperature sensor is disposed in a vicinity of either one of the discharge ports of the intake ducts forming the left-right pair.

13. The air cleaner device for a vehicle according to claim 1, wherein the intake ducts are formed such that lengths of the intake ducts from air cleaner case connecting portions attached so as to penetrate the air cleaner case to the discharge ports are longer than lengths of the intake ducts from the air cleaner case connecting portions to the intake ports.

14. The air cleaner device for a vehicle according to claim 1, wherein engaging portions are formed on parts of the intake ducts, the parts of the intake ducts being housed in the dirty side chamber, engagement receiving portions are formed on a ceiling of the dirty side chamber, and the engaging portions are engaged with the engagement receiving portions, whereby the intake ducts are fixed.

15. An air cleaner device for a vehicle comprising:
an air cleaner case having a filter element therein;
said air clearer case being partitioned into a dirty side chamber and a clean side chamber;
a plurality of intake ducts for leading ambient air into the dirty side chamber of the air cleaner case, the intake ducts forming a left-right pair;
wherein the intake ducts forming the left-right pair have intake ports opened outside side portions of the air cleaner case, and paths of the intake ducts leading to discharge ports, paths housed within the dirty side chamber include bent portions;
the discharge ports of the intake ducts forming the left-right pair are disposed so as to be oriented to a central side of the air cleaner case and offset from each other in a forward-rearward direction; and
a connecting tube for leading an intake air into the internal combustion engine is connected to the clean side chamber of the air cleaner case, and the discharge ports of the intake ducts at least partly overlap a suction port of the connecting tube as viewed in a plan view.

16. The air cleaner device for a vehicle according to claim 15, wherein the intake ducts are oriented upwardly from air cleaner case connecting portions attached so as to penetrate the air cleaner case to the discharge ports, and are inclined to vicinities of a ceiling of the dirty side chamber, and the discharge ports are oriented downwardly.

17. The air cleaner device for a vehicle according to claim 15,
wherein a fuel tank is mounted on an upper portion of a vehicle body frame of the vehicle; and
the air cleaner case is disposed between a head pipe of the vehicle body frame and the fuel tank, and the intake ports of the intake ducts are opened to a rear of the air cleaner case, and are disposed more to a front than a rear end portion of the air cleaner case.

18. The air cleaner device for a vehicle according to claim 15,
wherein a fuel tank is mounted on an upper portion of a vehicle body frame of the vehicle; and
the air cleaner case is disposed between a head pipe of the vehicle body frame and the fuel tank, and the intake ports of the intake ducts are disposed so as to be opened to a front of the air cleaner case.

19. The air cleaner device for a vehicle according to claim 15,
wherein the air cleaner case is divided into an upper side case half body and a lower side case half body, the filter element is disposed between the upper side case half body and the lower side case half body, the dirty side chamber is defined within the upper side case half body, and the clean side chamber is defined within the lower side case half body;
the upper side case half body of the air cleaner case is formed so as to be longer in a vehicle width direction than in a forward-rearward direction of the vehicle; and
the filter element has a plate shape, and is disposed such that a longitudinal direction of the filter element is parallel to the vehicle width direction.

* * * * *